Dec. 31, 1940.   I. R. GOLDBERG   2,226,812
PLANT PROTECTOR
Filed Aug. 10, 1938

INVENTOR
ISAAC R. GOLDBERG
BY
ATTORNEY

Patented Dec. 31, 1940

2,226,812

UNITED STATES PATENT OFFICE 2,226,812

PLANT PROTECTOR

Isaac R. Goldberg, St. Louis, Mo.

Application August 10, 1938, Serial No. 224,003

2 Claims. (Cl. 47—28)

This invention has to do generally with horticulture.

I have learned that to effectively shield and protect the seed immediately following planting and then during sprouting and also the plant during immaturity, from rodents, insects, and the elements and to regulate selectively the amount or quantity of exposure to air given the young plant or so-called seedling immensely aid and stimulate plant development and growth.

My present invention has hence for its object, and resides in, the provision of a simple, inexpensive shield or protector that may be readily and conveniently applied and manipulated over the plant for accomplishing the results stated.

In the accompanying drawing—

Figure 3:
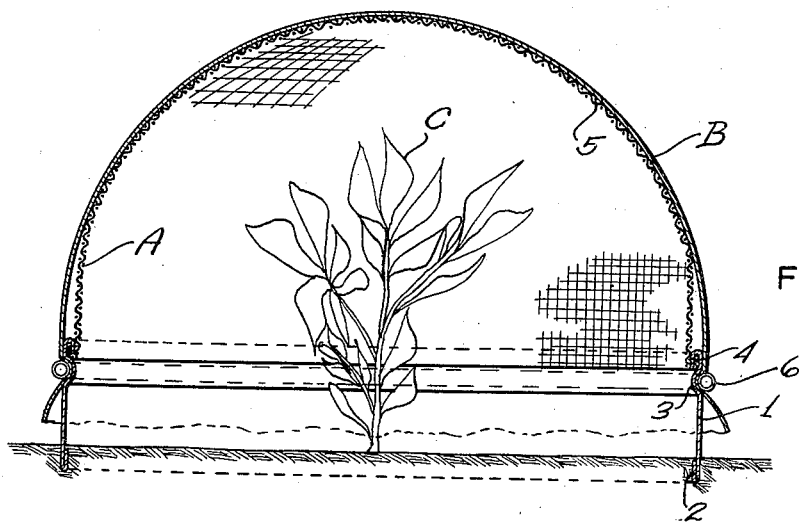
Figure 3 is an enlarged vertical sectional view of a plant protector of my invention.

Referring now in more detail and by reference characters to the drawing, which illustrates practical embodiments of my invention, the plant protector includes a main or supporting-frame A, which, in turn, comprises a ring-shaped edgewise-upstanding base-member 1 rolled or otherwise formed preferably of sheet metal or other suitable material preferably doubled upon itself and thereby reinforced at its lower margin, as at 2, and provided adjacent its upper margin with a circumferential outwardly facing channel 3, all as best seen in Figure 3 and for purposes presently more fully appearing.

Figure 4:
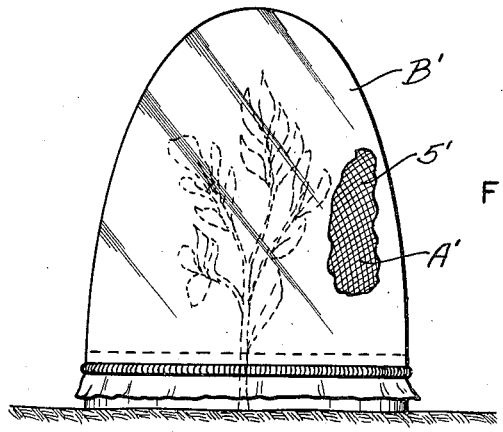
Figure 4 is an elevational view of a modified form of plant protector embodying my invention.

Forming part of the frame A, and at its lower peripheral margin secured, as by crimped engagement under a bent-over flange 4, to the upper peripheral margin of the base-member or ring 1, is a sufficiently arched or arcuate dome of some rigidity constructed preferably of screen-wire or other suitable mesh or reticulated material. Preferably this dome, as at 5, Figure 3, is of hemispherical contour, as shown. However, to meet the requirements of certain growing plants, such dome, as at 5', Figure 4, may have the form of an elongated paraboloid, also as shown.

Forming part of the protector and adapted for snug disposition over the outer surface of the particular dome, is a preferably translucent hood B constructed preferably of suitable flexible water-proof material, such, for instance, as waxed paper, of initially flat sheet-like form and of such size as to extend over the frame-dome and project marginally downwardly over the outer face of the base ring 1, in which position the hood B is secured to the frame A as by means of a tightly drawn retaining-band 6, which may be formed of an endless spiral spring, a looped wire, or even a slip-loop string.

In use and practice, the seedling C is transplanted from the hotbed to the field, and a protector-frame A placed shieldingly over the seedling C and pressed downwardly into the soft earth for a short distance to embed the ring 1 at its marginal rim 2 in the earth. The hood B is then placed over the frame-dome and secured in place by means of a retaining band 6.

Thus disposed over and about the seedling C, the protector will allow the warm rays of the spring sunshine to pass inwardly for stimulation of the growing plant C and, at the same time, prevent the cold wind and air current from chilling or retarding plant growth. In addition, the protector effectively and positively shields the tender seedling from insects, field mice or other rodents, and fungus organisms. The employment of an insecticide upon the plant is hence totally obviated, and this fact also assists in the development of a healthy plant, for sprays and other poisons capable of killing insects and the like always retard plant growth. Further, the protector shields the young immature plant against physical damage resulting from frost, winds, rains, and hail storms, and even accidental carelessness of the field workers in walking through the plant-patches.

Figure 1:
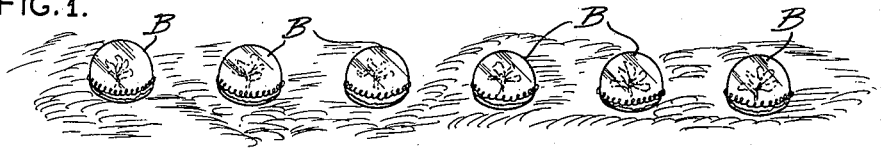
Figure 1 shows in perspective a plurality of so-called plant-shields or protectors of my invention as installed in covering position upon a row of spaced seedlings.
Figure 2:
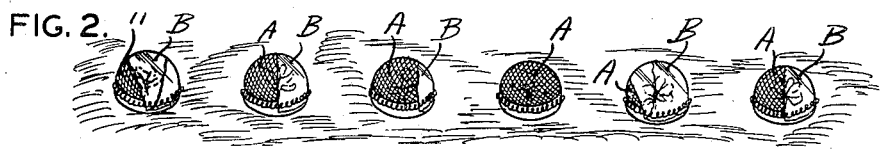
Figure 2 shows the protectors or shields of Figure 1 in different selected adjustment for varying the degree of plant-exposure.

As shown in Figure 2, the hood B may be variously turned back over the frame A and thus the exposure of the growing plant to air may be selectively regulated, flexibility of the shield in such regard assisting in toughening the plant, while at the same time shielding the plant from relatively cold North and West winds. The frame member A, however, continues to protect the tender seedling C from physical damage which may result from insects, rodents, hail, and other causes.

Such control of air and moisture not only insures hearty and rapid development of the plant, but also toughens the plant and makes it appreciably more hardy. In addition, it is not necessary to employ insect sprays which are harmful to the plant tissue and thus retard growth, as has been stated. Obviously, when the plant has grown to sufficient height and strength, the frame member A may be removed, thus permitting the plant to continue its growth unprotected. At this more mature stage of growth, however, the plant is normally of sufficient size and strength to overcome all normal hazards.

I may add that the protector also enables the plants to be set out from three to four weeks earlier than open field planting, and by means of the protector, the ground may be quite effectively preheated prior to planting.

The protector may be inexpensively produced and is exceedingly efficient in the performance of its intended functions.

It will be understood that changes and modifications in the form, construction, arrangement, and combination of the several parts of the protector may be made and substituted for those herein shown and described without departing from the nature and principle of my invention.

Having thus described my invention, what I claim and desire to secure by Letters Patent is—

1. A plant protector comprising, in combination, an edgewise upstanding base wall member having upon its outer face an inwardly depressed annular channel, a foraminous dome marginally secured to the base wall member above said channel, a translucent waterproof hood disposed in overlying relationship upon the dome and projecting marginally over the outer face of the base wall member, and means engageable with said marginally projecting portion of the hood for drawing said portion into retentive engagement within said channel.

2. A plant protector comprising, in combination, an upstanding base wall, a reticulated dome marginally secured to the base wall, a hood constructed of a flexible sheet of material for foldable adjustment over and upon the dome for covering selective portions thereof, said sheet having a marginal portion depending over the base wall in each of the folded adjustments thereof, and means engageable with said depending marginal hood-portion and base wall for detachably securing the hood in folded adjustment to the base wall and over the dome.

ISAAC R. GOLDBERG.